United States Patent
Rowe

(10) Patent No.: US 10,962,100 B2
(45) Date of Patent: Mar. 30, 2021

(54) ENGINE PULLEY MOVEMENT DETECTION

(71) Applicant: DENSO International America, Inc., Southfield, MI (US)

(72) Inventor: Trevor Rowe, Sterling Heights, MI (US)

(73) Assignee: Denso International .America, Inc., Southfield, MI (US)

( * ) Notice: Subject to any disclaimer, the term of this patent is extended or adjusted under 35 U.S.C. 154(b) by 0 days.

(21) Appl. No.: 16/520,473

(22) Filed: Jul. 24, 2019

(65) Prior Publication Data
US 2021/0025486 A1 Jan. 28, 2021

(51) Int. Cl.
| | |
|---|---|
| *F16H 57/01* | (2012.01) |
| *F16H 55/36* | (2006.01) |
| *F02D 41/22* | (2006.01) |
| *F02N 11/04* | (2006.01) |
| *F02B 67/06* | (2006.01) |
| *H02K 7/10* | (2006.01) |
| *H02K 7/18* | (2006.01) |
| *G01L 1/22* | (2006.01) |
| *F02N 11/00* | (2006.01) |

(52) U.S. Cl.
CPC ............. *F16H 57/01* (2013.01); *F02B 67/06* (2013.01); *F02D 41/221* (2013.01); *F02N 11/003* (2013.01); *F02N 11/04* (2013.01); *F16H 55/36* (2013.01); *G01L 1/22* (2013.01); *H02K 7/1004* (2013.01); *H02K 7/1815* (2013.01); *F16H 2057/014* (2013.01)

(58) Field of Classification Search
CPC .... F16H 57/01; H02K 7/1004; H02K 7/1807; H02K 7/1815; G01L 1/22
See application file for complete search history.

(56) References Cited

U.S. PATENT DOCUMENTS

| | | | | | |
|---|---|---|---|---|---|
| 2,754,465 | A | * | 7/1956 | Brier | B62D 5/0415 318/488 |
| 3,612,966 | A | * | 10/1971 | Dybel | G01L 5/0076 361/170 |
| 5,952,586 | A | * | 9/1999 | Matui | G01L 3/1414 73/862.194 |

(Continued)

FOREIGN PATENT DOCUMENTS

| | | |
|---|---|---|
| DE | 102016208540 A1 | 2/2017 |
| DE | 102017115612 A1 | 1/2019 |
| GB | 1349407 A | 4/1974 |

*Primary Examiner* — Sean Gugger
(74) *Attorney, Agent, or Firm* — Brooks Kashman P.C.

(57) ABSTRACT

Pulley-movement detection within an alternator or integrated starter/generator (ISG) for a vehicle is provided. The alternator or ISG includes a housing, a stator fixed within the housing, a rotor configured to rotate relative to the stator about an axis, and a shaft coupled to the rotor for rotation about the axis. The alternator or ISG also includes pulley coupled to the shaft at an interface, and configured to engage with a chain or belt to transfer movement between the shaft and the chain or belt. An electrical switch located at the interface is configured to be in a first state when the pulley is axially secured to the shaft, and a second state when the pulley is axially displaced away from the shaft. This can enable signals or warnings to be output in response to the electrical switch changing states, indicating an improper connection at the interface.

18 Claims, 2 Drawing Sheets

(56) References Cited

U.S. PATENT DOCUMENTS

| | | | | |
|---|---|---|---|---|
| 2004/0244504 | A1* | 12/2004 | Yuan | G01L 3/108 |
| | | | | 73/862.453 |
| 2005/0194187 | A1* | 9/2005 | Gleitman | E21B 7/24 |
| | | | | 175/57 |
| 2006/0054128 | A1* | 3/2006 | Allyn | F02B 67/06 |
| | | | | 123/198 D |
| 2010/0226052 | A1* | 9/2010 | Yang | H02K 7/108 |
| | | | | 361/23 |
| 2012/0173167 | A1* | 7/2012 | Lukatela | G01L 5/225 |
| | | | | 702/42 |
| 2013/0172137 | A1* | 7/2013 | Antchak | F16H 7/12 |
| | | | | 474/133 |
| 2014/0309882 | A1* | 10/2014 | Antchak | F16H 7/12 |
| | | | | 701/36 |
| 2015/0057117 | A1* | 2/2015 | Antchak | F16H 7/1281 |
| | | | | 474/109 |
| 2015/0069762 | A1* | 3/2015 | Mashtare | F03D 17/00 |
| | | | | 290/55 |
| 2016/0209282 | A1* | 7/2016 | Morollon | G01L 3/108 |
| 2018/0127054 | A1* | 5/2018 | Venzal | B62M 6/50 |
| 2019/0099119 | A1* | 4/2019 | Wakeham | A61B 5/224 |
| 2019/0101177 | A1* | 4/2019 | Parnoutsoukian | F16F 3/12 |
| 2019/0137352 | A1* | 5/2019 | Edwards | G01N 27/023 |
| 2019/0201030 | A1* | 7/2019 | Shelton, IV | A61B 17/1285 |

* cited by examiner

ENGINE PULLEY MOVEMENT DETECTION

TECHNICAL FIELD

The present disclosure relates to a system and associated structure for detecting movement or an improper connection of an engine pulley.

BACKGROUND

Internal combustion engines typically include a serpentine belt which drives various peripheral devices, such as an alternator, power steering pump, water pump, air conditioning compressor, air pump, etc. Idler pulleys and/or belt tensioners may also be provided to increase tension in the belt. As the engine is operated, the belt moves along its serpentine path, driving the peripheral devices to enable those devices to power associated systems, such as power steering, air conditioning, battery, etc.

In some engine applications, such as in a hybrid vehicle, an integrated starter/generator (ISG) is provided. The ISG can use the vehicle's battery and electric motor to power the engine's crankshaft via the belt. This is also known as a belt-integrated starter/generator (BSG) or a belt assisted starter/generator (BAS). The ISG can also be located between the engine and transmission, along with a clutch, so that the ISG can start the engine while the engine is disconnected from downstream of the powertrain.

SUMMARY

According to one embodiment, an alternator or integrated starter/generator (ISG) for a vehicle is provided. The alternator or ISG includes a housing, a stator fixed within the housing, a rotor configured to rotate relative to the stator about an axis, and a shaft coupled to the rotor for rotation about the axis. The alternator or ISG also includes pulley disposed outside of the housing, coupled to an axial end of the shaft at an interface, and configured to engage with a chain or belt to transfer movement between the shaft and the chain or belt. The alternator or ISG also includes an electrical switch located at the interface and configured to be in a closed position when the pulley is axially secured to the shaft, and an open position when the pulley is axially displaced away from the shaft.

In another embodiment, a system for detecting an improper connection between a pulley and a shaft of an alternator or integrated starter/generator (ISG) is provided. The system includes a rotor extending about an axis, a shaft configured to rotate within the rotor about the axis, and a pulley coupled to an axial end of the shaft and configured to engage with a chain or belt to transfer movement between the shaft and the chain or belt. A sensor is configured to detect (i) axial separation of the pulley from the shaft, or (ii) axial compression between the pulley and the shaft.

According to another embodiment, an engine pulley assembly includes a shaft, a pulley coupled to the shaft and configured to rotate therewith to transfer rotation of the shaft to a belt or chain, and a sensor disposed at an interface between the shaft and the pulley. A controller is configured to output a check-engine message in response to the sensor indicating (i) a separation of the pulley from the shaft, or (ii) a compression between the pulley and the shaft exceeding a threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
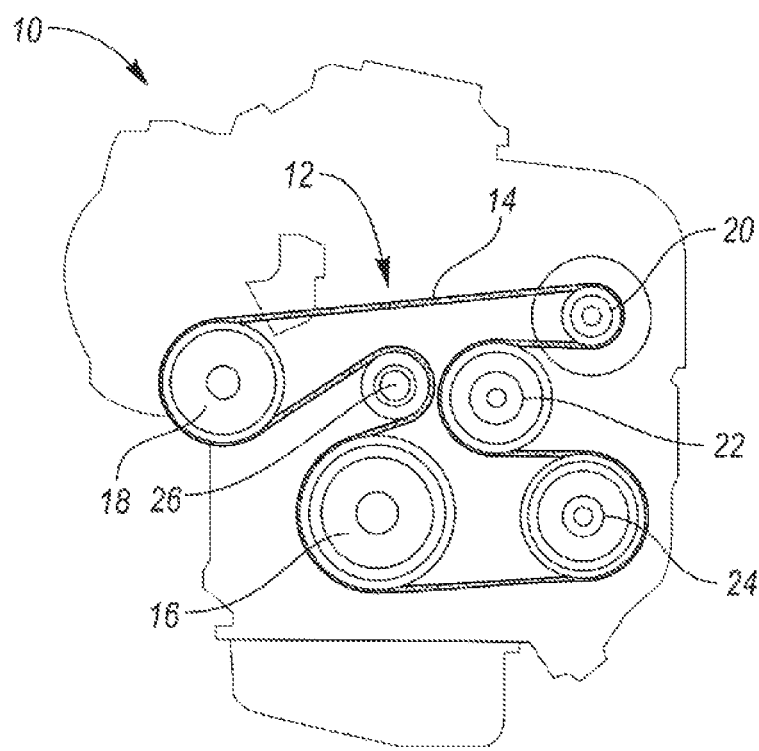
FIG. 1 illustrates a schematic of an engine belt system, e.g., a serpentine belt, with various pulleys and/or wedges, according to one embodiment.

FIG. 1 illustrates one example of an engine 10 having an engine belt system 12. The belt system 12 includes a belt 14, also referred to as a serpentine belt. The belt 14 wraps around a crankshaft pulley 16 that rotates with the engine's crankshaft. As the crankshaft is rotated during operation, the belt 14 moves along its serpentine path to rotate other pulleys and power those associated systems. This may include, for example, a power steering pump pulley 18 that powers the vehicle's power steering system, an alternator pulley 20 (or a generator pulley) that powers the alternator to charge the vehicle's battery and power the electrical system as the engine runs, a water pump pulley 22 that powers the water pump of the engine's radiator, and an air conditioner (A/C) compressor pulley 24 that powers the air compressor of the vehicle's air conditioner. A belt tensioner pulley 26 may also be provided which does not power an associated vehicle system but rather maintains tension on the belt 14 as the belt moves.

While not shown herein, one or more of the pulleys can be replaced with an integrated starter/generator (ISG) pulley. For example, the alternator pulley 20 may be removed and instead an ISG pulley can be utilized. The ISG pulley can, when powered, turn to move the belt 14 so that the engine 10 can be started. This may be in a hybrid vehicle, for example.

The pulleys shown in FIG. 1 are merely examples, and can include more or less than the pulleys shown, and/or different types of pulleys. Moreover, the arrangement shown in FIG. 1 is merely an example.

Some alternators and ISGs use a wedge to selectively lock the pulley onto the associated shaft that the pulley is connected to. During times of high torque or vibration, the wedge does not provide clamp force to prevent the pulley from rotating, thus allowing the pulley to rotate. However, when there is not enough clamp force, the pulley has a potential to be inhibited from spinning, potentially causing a loss of power. The wedge must be configured to handle high torque loads of the ISG to turn the belt and start the engine. Other pulleys (such as those described above, for example) also have a potential to come slightly dislodged or disconnected from their associated shaft that the pulley is connected to. This has a potential to cause an unwanted noise, vibration, and loss of power to that particular system.

Therefore, according to various embodiments described herein, a sensor is provided that is specifically designed and configured to detect an improper connection between the pulley (or wedge) and the associated shaft for that pulley (or wedge). In particular, the sensor can detect an axial disconnection between the pulley and the associated shaft, or can also detect an undesirably large amount of axial compression between the pulley and the associated shaft. The sensor can be part of an alternator pulley, or an ISG pulley, or any of the other types of pulleys described above, for example.

For the sake of brevity, the term "pulley" is used herein as a location for where the sensor is located. However, it should be understood that the term "pulley" can also refer to an associated wedge.

Figure 2:
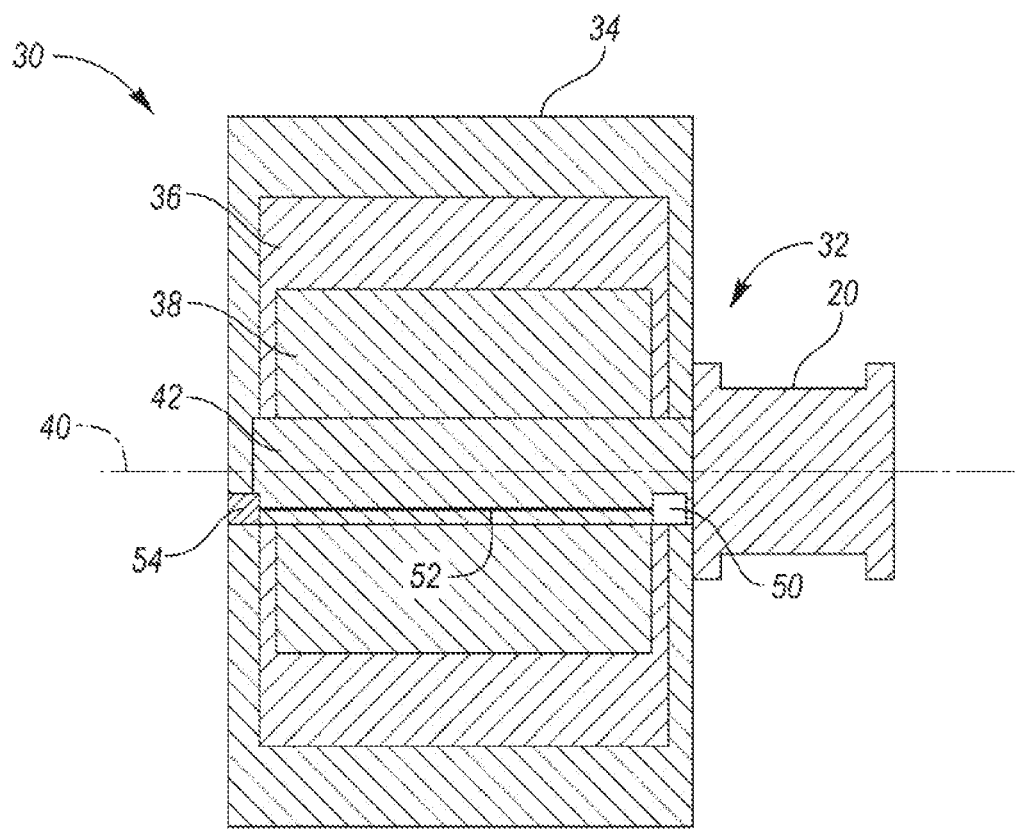
FIG. 2 illustrates a cross-sectional view of an alternator and an associated pulley system with a pulley assembled to an associated shaft of the alternator, according to one embodiment.

FIG. 2 shows a cross-sectional view of an alternator 30 and an associated pulley system 32, according to one embodiment. The alternator 30 includes an outer casing or housing 34 that at least partially surrounds or encompasses the components of the alternator 30. In the illustrated embodiment, the alternator 30 includes a stator 36 which can include stator windings, such as a central band having an iron core and copper windings, and end bands where the windings are more exposed. The stator 36 is disposed radially about a rotor 38. The rotor 38 is configured to rotate about a central axis 40 to produce a rotating magnetic flux. Rotation of the rotor 38 relative to the stator 36 induces electricity in the armature coils of the stator 36 that can be sent to and stored in the vehicle's battery. The rotor 38 is fixed to or extends from to a central shaft 42 that rotates about the central axis 40.

To rotate the shaft 42 and thus the rotor 38, a pulley 20 is provided. The pulley 20 is operated by the belt 14 of the engine 10, explained above. Spinning of the pulley 20 via the belt 14 turns the shaft 42, which in turn rotates the rotor 38 relative to the stator 36 to induce electricity for storage in a battery. As will be explained below, the pulley system 32 includes a sensor 50 for detecting an improper connection between the pulley 20 and the shaft 42, along with a wire 52 and a brush 54.

Figure 3:
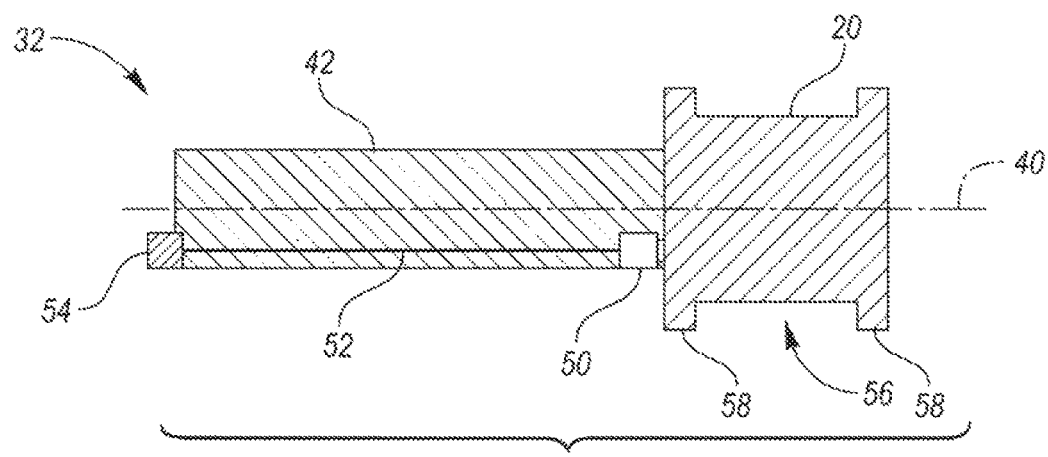
FIG. 3 illustrates a cross-sectional view of a pulley connected to a shaft in isolation, according to one embodiment.

FIG. 3 shows the pulley system 32 in isolation, removed from the remaining parts of the alternator 30. It should be understood that the teachings of the pulley system 32 shown in FIGS. 3-4B can be implemented in other pulley systems for powering other vehicle subsystems, such as an ISG, an A/C compressor, a water pump, a power steering system, etc.

The pulley assembly 32 includes the pulley 20, the shaft 42, and the sensor 50 for detecting an improper connection between the pulley 20 and the shaft 42. An improper connection can be caused by various forces. For example, the pulley 20 may have a groove 56 for receiving the belt 14 as the belt 14 turns the pulley 20. On either side of the groove 56 may be flanges 58 for maintaining the belt 14 at a certain axial position on the pulley 20. Over-tensioning of the belt 14 has the potential to lift a part of the pulley 20 away from the shaft 42. Conversely, other forces within the engine belt system 12 can cause an over-compression in the axial direction between the pulley 20 and the shaft 42.

The sensor 50 is provided to detect either or both of these undesirable scenarios. The sensor 50 may be provided at an axial interface between the pulley 20 and the shaft 42. In other words, the sensor 50 may be located at an axial end of the shaft 42, and may make contact with the pulley 20.

Figure 4A:
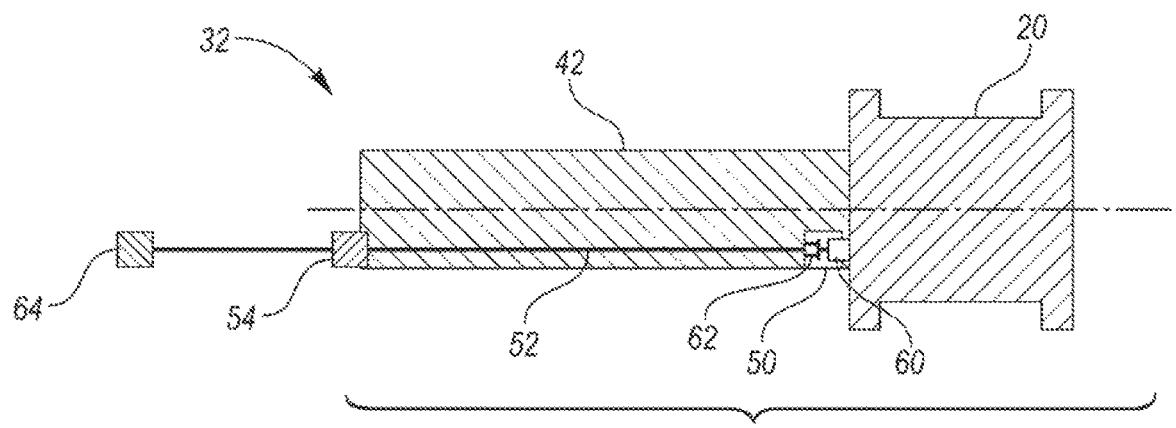
FIG. 4A illustrates a cross-sectional view of a pulley connected to a shaft in isolation, according to an embodiment in which the pulley is either properly connected to the shaft or is in heightened compression.
Figure 4B:
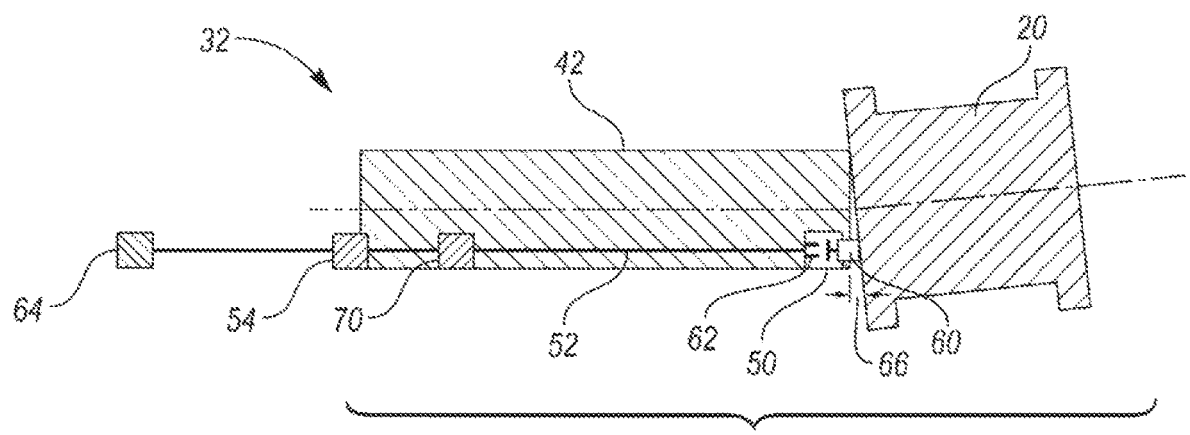
FIG. 4B illustrates a cross-sectional view of a pulley connected to a shaft in isolation, according to an embodiment in which the pulley is slightly disconnected to the shaft.

FIGS. 4A and 4B show the pulley assembly 32 with a proper connection (FIG. 4A) and an improper connection (FIG. 4B). The sensor 50 may be an electrical switch having a first contact member 60 (e.g., a sensor switch) that is biased away from a second contact member 62. When the pulley 20 is properly secured onto the shaft 42 (e.g., bolted), the first contact member 60 is pushed into engagement with the second contact member 62. This causes the electrical switch to be in a closed position, completing a circuit.

With the circuit closed, an electrical signal can be sent through one or more electrical wires 52. The electrical wires 52 can be made of copper or carbon, for example. The wires 52 can be embedded or otherwise secured to the shaft 42, and can extend axially along the shaft 42 from one end to the other. The signal is then sent to the brush 54. The brush 54 is coupled to a low-voltage connector located in, for example, the housing of the surrounding structure (e.g., housing 34 of the alternator 30). This signal can then pass to an electrical bus, for example. A controller (not shown) can be electrically coupled to this low-voltage connector.

If the pulley 20 is dislodged, offset, or otherwise improperly disconnected from the shaft 42, a gap 66 may exist axially between a portion of the pulley 20 and the shaft 42. This may open the circuit; contact is no longer made between the first contact member 60 and the second contact member 62, and therefore an electrical signal (or lack thereof) may be detected by a controller 64, indicating an improper connection. It may be said that the electrical switch is operating in an open position.

In response to the electrical switch being in the open position, the controller 64 may cause a signal to be sent to a vehicle operator (e.g., a driver of the vehicle). For example, a "CHECK ENGINE" light (or the like) may be activated on an instrument cluster by the controller 64. Other similar visual indicators may be sent to the operator. The controller 64 may also inform a technician (via an OBD-II port, for example) of the switch being open, and therefore an improper connection of the pulley 20 with the shaft 42.

The sensor 50 can also have pressure-detecting capabilities, such as a strain gauge. In an embodiment, the electrical switch is made such that it can sense a predetermined range of pressure (e.g., in Newtons) exerted from the pulley 20 into the shaft 42. For example, the pressure between the first contact member 60 and the second contact member 62 of a strain gauge may be detected. A signal may be sent (via wire 52 and brush 54, for example) if the detected pressure is outside a predetermined range, indicating an improper connection. In one embodiment, the predetermined range of allowable pressure is 1-100 Newtons. In another embodiment, the predetermined range of allowable pressure is 5-80 Newtons.

In one embodiment, the controller 64 commands a visual indicator (such as the examples explained above) in response to the pressure being less than a minimum threshold (e.g., 1 N). This indicates that a likelihood of a gap 66 existing, and therefore the pulley 20 not being properly situated with respect to the shaft 42. In addition, the controller 64 can command the visual indicator in response to the pressure exceeding a maximum threshold (e.g., 100 N). This indicates a large compression force exerted on the shaft 42 from the pulley 20. If the strain gauge detects the pressure exceeding the maximum threshold, the switch may open, and the controller will activate the visual indicator. This scenario also has a potential to cause damage or unwanted noise or vibration at the pulley 20, and thus the signal informs the operator or technician of this.

In the case of the pulley assembly 32 being part of an alternator 30, the use of the sensor 50 can enable the use of a second brush. In one example, a second brush 70 is located along the wire 52 axially between the sensor 50 and the brush 54. The alternator 30 can use the main brush 54 for energizing the armature coils within the alternator 30, and the second brush 70 can be dedicated to the sensor 50.

The controller 64 can be any suitable controller for receiving an electrical signal from the sensor 50 and correspondingly controlling a visual indicator (e.g., "CHECK ENGINE" light) on the vehicle. In this disclosure, the terms "controller" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller 50 may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Pert, and PL/SQL. The computer-executable instructions of the programs may be configured, upon execution by the processor, to cause the controller to activate or excite the alert to the driver.

In certain embodiments, the controller 64 is a binary controller, such that a signal indicating the sensor 50 operating in the closed position causes no visual display to be illuminated, and a signal indicating the sensor 50 operating in the open position causes the visual display to be illuminated.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An alternator or integrated starter/generator (ISG) for a vehicle, the alternator or ISG comprising:
    a housing;
    a stator fixed within the housing;
    a rotor configured to rotate relative to the stator about an axis;
    a shaft coupled to the rotor for rotation about the axis;
    a pulley disposed outside of the housing, coupled to an axial end of the shaft at an interface, and configured to engage with a chain or belt to transfer movement between the shaft and the chain or belt; and
    an electrical switch located at the interface and configured to be in a closed position when the pulley is axially secured to the shaft, and an open position when the pulley is axially displaced away from the shaft, wherein the switch includes a first contact member and a second contact member, wherein contact between the pulley and the shaft forces the first contact member into engagement with the second contact member to complete an electrical circuit therebetween.

2. The alternator or ISG of claim 1, further comprising a strain gauge located at the interface and configured to detect a pressure between the pulley and the shaft.

3. The alternator of ISG of claim 2, wherein the strain gauge and the electrical switch are located within a single sensor housing as part of a combined switch and strain gauge.

4. The alternator or ISG of claim 1, further comprising a brush at a second axial end of the shaft, and an electrical conduit connecting the electrical switch to the brush.

5. The alternator or ISG of claim 4, wherein the housing includes a low-voltage connector that electrically connects the brush to an electrical bus.

6. The alternator or ISG of claim 1, further comprising a controller configured to output a check-engine message in response to the electrical switch being in the open position.

7. A system for detecting an improper connection within an alternator or integrated starter/generator (ISG), the system comprising:
    a rotor extending about an axis;
    a shaft configured to rotate within the rotor about the axis;
    a pulley coupled to an axial end of the shaft and configured to engage with a chain or belt to transfer movement between the shaft and the chain or belt; and a sensor configured to detect axial separation of the pulley from the shaft, wherein the sensor includes a first contact member and a second contact member, wherein contact between the pulley and the shaft forces the first contact member into engagement with the second contact member to complete an electrical circuit therebetween.

8. The system of claim 7, wherein the sensor includes an electrical switch located at an interface between the pulley and the shaft, the switch configured to be in (i) a closed position when the pulley contacts the shaft, and (ii) an open position when the pulley is axially displaced away from the shaft.

9. The system of claim 8, further comprising a controller configured to output a check-engine message in response to the switch being in the open position.

10. The system of claim 7, wherein the sensor is a strain gauge configured to measure a pressure exerted at an interface between the pulley and the shaft.

11. The system of claim 10, wherein the sensor does not include an electrical switch configured to alternate between an open and closed position at the interface.

12. The system of claim 7, further comprising a brush at a second axial end of the shaft, and an electrical conduit connecting the sensor to the brush.

13. The system of claim 12, wherein the rotor is housed within a housing, and wherein the housing includes a low-voltage connector that electrically connects the brush to an electrical bus.

14. An engine pulley assembly comprising:
a shaft;
a pulley coupled to the shaft and configured to rotate therewith to transfer rotation of the shaft to a belt or chain;
a sensor disposed at an interface between the shaft and the pulley; and
a controller configured to output a check-engine message in response to the sensor indicating a separation of the pulley from the shaft;
wherein the sensor includes a first contact member and a second contact member, wherein contact between the pulley and the shaft forces the first contact member into engagement with the second contact member to complete an electrical circuit therebetween.

15. The engine pulley assembly of claim 14, wherein the sensor includes an electrical switch configured to be in a closed position when the pulley is contacting the shaft, and an open position when the pulley is axially displaced away from the shaft, and the controller is configured to output the check-engine message in response to the electrical switch being in the open position.

16. The engine pulley assembly of claim 14, wherein the sensor includes a strain gauge configured to detect a compression force between the pulley and the shaft, wherein the controller is configured to output the check-engine message in response to the compression force exceeding the threshold.

17. The engine pulley assembly of claim 14, wherein the separation of the pulley from the shaft is indicated by a compression force being less than a minimum threshold, and the controller is configured to output the check-engine message in response to the compression force being less than the minimum threshold.

18. The engine pulley assembly of claim 14, further comprising:
a housing that at least partially houses the shaft,
a brush at an axial end of the shaft opposite the interface, and
an electrical conduit connecting the electrical switch to the brush,
wherein the housing includes a low-voltage connector that electrically connects the brush to an external bus.

* * * * *